United States Patent Office 3,340,278
Patented Sept. 5, 1967

3,340,278
5(10),7-ESTRADIENE-3,17-DIONE AND THE PROCESS FOR THE PRODUCTION THEREOF
Gunther Krüger, St. Laurent, Quebec, Canada, assignor to American Home Products Corporation, New York, N.Y., a corporation of Delaware
No Drawing. Filed May 3, 1965, Ser. No. 452,886
6 Claims. (Cl. 260—397.3)

ABSTRACT OF THE DISCLOSURE

There is disclosed herein a process for preparing 5(10),7-estradiene-3,17-dione, 3,17β-dihydroxy - 5(10),7-estradiene, and 17β-hydroxy -5(10),7-estradien-3-one, useful as intermediates in the preparation of equilin, comprising either pyrolyzing androsta-4,7-dien-19-ol-3,17-dione or reducing that compound to the corresponding 17β-hydroxy derivative, and pyrolyzing the latter compound; or, alternatively, reducing 10-acetoxyestra - 4,7-diene-3,17-dione with zinc in acetic acid, or reducing said compound with sodium borohydride or lithium aluminum tri-(tert.-butoxy)-hydride to the corresponding 17β-hydroxy derivative and reducing the latter compound with zinc in acetic acid.

The present invention relates to a novel derivative of estradiene, and to methods for its preparation. More specifically this invention relates to 5(10),7-estradiene-3,17-dione and to methods for obtaining that compound from easily available starting materials. Moreover, it relates to novel methods for preparing the closely related derivatives thereof, 3,17β-dihydroxy-5(10),7-estradiene and 17β-hydroxy-5(10),7-estradien-3-one, both described in U.S. Patent 2,930,805, issued Mar. 29, 1960. The above three compounds may be represented by the generic formula

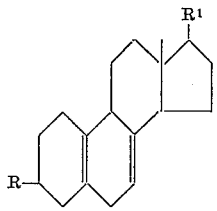

in which R and R¹ are selected from the group consisting of the following combinations: R and R¹ each represents hydroxyl, R and R¹ each represent ketonic oxygen, and R represents ketonic oxygen with R¹ representing hydroxyl.

The novel compound 5(10),7-estradiene-3,17-dione is useful as an intermediate in the preparation of biologically active steroids. Thus, it may be reduced to the corresponding diol, 3,17β-dihydroxy-5(10),7-estradiene, a powerful anti-estrogenic compound. Moreover, all three of the compounds represented by the above generic formula may easily be converted to equilin, a powerful natural estrogen, by microbiological transformation with the microorganism Nocardia restrictus. Thus, when incubating any of the above three compounds as the substrate in a suitable nutrient medium with growing or dormant cultures of Norcardia restricuts, separating the bulk of the bacterial culture from the beer by filtration or centrifugation, extracting the beer with a suitable water-immiscible solvent, and evaporating the latter, equilin is obtained. This microbiological transformation is more fully described in the copending U.S. patent application of C. Vezina, D. J. Marshall, and R. Deghenghi, S.N. 471,415, filed July 12, 1965.

It is a particular advantage of this invention that starting materials for the microbiological preparation of equilin may be prepared from steroids which do not possess an aromatic ring A and which are easily available. Thus, 5(10),7-estradiene-3,17-dione may be prepared from androsta-4,7-dien-19-ol-3,17-dione, described in U.S. Patent 3,162,655, issued Dec. 22, 1964, by pyrolysis, or from 10-acetoxyestra-4,7 diene-3,17-dione by reduction with zinc dust; the latter starting material is described in my copending U.S. patent application S.N. 440,597, filed Mar. 17, 1965. 3,17β-dihydroxy-5(10),7-estradiene may be prepared from the above diketone by reduction with lithium aluminum hydride or sodium borohydride; 17β-hydroxy-5(10),7-estradien-3-one may be prepared from androsta-4,7-diene-19-ol-3,17-dione by reduction with sodium borohydride or lithium aluminum tri-(tert.-butoxy)hydride to yield the intermediate 17β,19-dihydroxyandrosta-4,7-dien-3-one, which is in turn pyrolyzed to 17β-hydroxy-5(10),7-estradien-3-one; alternatively, 10-acetoxyestra-4,7-diene-3,17-dione may be reduced with sodium borohydride or lithium aluminum tri-(tert.-butoxy)hydride to yield the intermediate 10-acetoxyestra-4,7-dien-17β-ol-3-one, which upon treatment with zinc in acetic acid yields also 17β-hydroxy-5(10),7-estradien-3-one. The reduction of the latter compound to 3,17β-dihydroxy-5(10),7-estradiene has been described in U.S. Patent 2,930,805, cited above.

The following formulae will illustrate my invention.

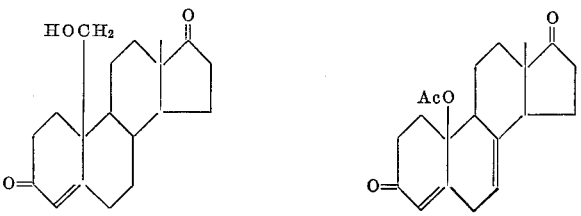

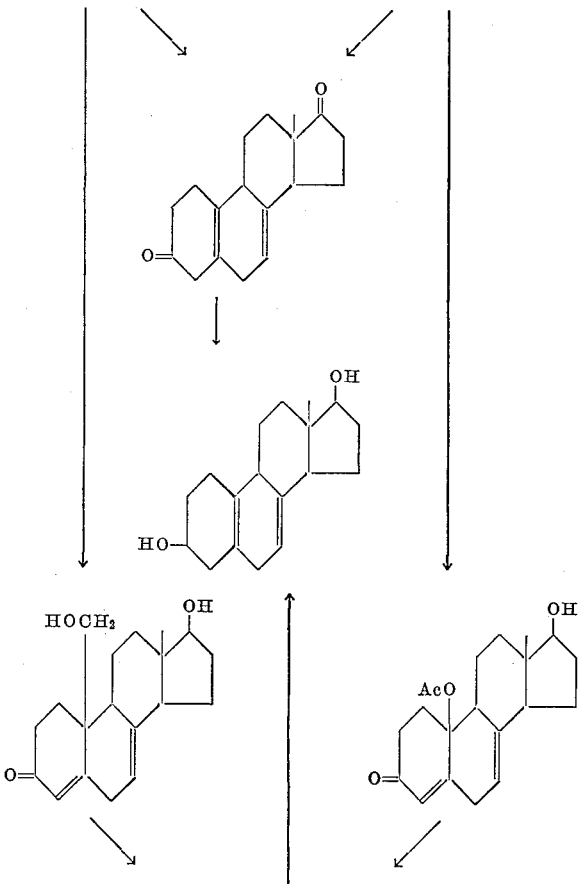

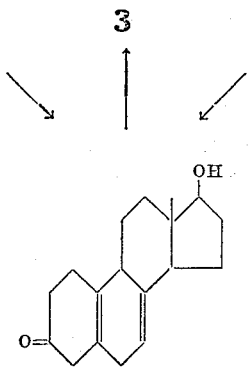

Example 1

Androsta-4,7-dien-19-ol-3,17-dione is distilled repeatedly at pressures of less than 1 mm. Hg in a horizontal tube at 350° C. Chromatography and recrystallization from ether-hexane gives 5(10),7-estradiene-3,17-dione, M.P. 125–129° C.

Example 2

10-acetoxyestra-4,7-diene-3,17-dione (1.0 g.), dissolved in 10 ml. acetic acid, is agitated with 2.0 g. of zinc dust for 16–86 hours in an atmosphere of nitrogen. Filtration, dilution with water and extraction with ether gives 5(10),7-estradiene-3,17-dione, recrystallized from ether-hexane to M.P. 125–129° C.

Example 3

Sodium borohydride (100 mg.) is added in small portions to a stirred ice-cold suspension of 100 mg. of 5(10),7-estradiene-3,17-dione in 3 ml. methanol; stirring is continued for one hour at room temperature after the above addition is complete, and water is added. The mixture is extracted with chloroform, the solvent dried and evaporated and the residue crystallized from methanol-water, to obtain 3,17$\beta$-dihydroxy-5(10),7-estradiene, identical with an authentic sample.

In the same manner, by using lithium aluminum hydride in tetrahydrofuran instead of sodium borohydride in methanol, 3,17$\beta$-dihydroxy-5(10),7-estradiene is also obtained.

Example 4

(a) One millimole of 10-acetoxyestra-4,7-diene-3,17-dione is treated with one millimole of sodium borohydride in methanol. The reaction is followed by thin-layer chromatography and interrupted by addition of dilute acetic acid when most of the starting material has disappeared. Dilution with water, extraction with chloroform, followed by evaporation of the solvent and crystallization yields 10-acetoxyestra-4,7-dien-17$\beta$-ol-3-one.

In the same manner, by using lithium aluminum tri-tert.-butoxy)hydride in tetrahydrofuran instead of sodium borohydride in methanol, and working-up as above, 10-acetoxyestra-4,7-dien-17$\beta$-ol-3-one is also obtained.

(b) 10-acetoxyestra-4,7-dien-17$\beta$-ol-3-one obtained as above (1.0 g.), is dissolved in 10 ml. acetic acid and stirred with 2.0 g. of zinc dust for 86 hours in an atmosphere of nitrogen. Filtration, dilution with water and extraction with ether yields 17$\beta$-hydroxy-5(10),7-estradien-3-one.

Example 5

(a) One millimole of androsta-4,7-dien-19-ol-3,17-dione is treated with one millimole of sodium borohydride in methanol. The reaction is followed by thin-layer chromatography and interrupted by addition of dilute acetic acid when most of the starting material has disappeared. Dilution with water, extraction with chloroform, followed by evaporation of the solvent and crystallization yields 17$\beta$,19-dihydroxyandrost-4,7-dien-3-one.

In the same manner, by using lithium aluminum tri-(tert.-butoxy)hydride in tetrahydrofuran instead of sodium borohydride in methanol and working-up as above, 17$\beta$,19-dihydroxyandrosta-4,7-dien-3-one is also obtained.

(b) Androsta-4,7-diene-17$\beta$,19-diol-3-one obtained as above, is distilled repeatedly at pressures of less then 1 mm. Hg in a horizontal tube at 350° C. Chromatography and recrystallization from ether-hexane gives 17$\beta$-hydroxy-5(10),7-estradien-3-one.

Example 6

Erlenmeyer flasks (250 ml. size), containing 50 ml. of a medium having a pH of about 6.5 (made up of a commercial glucose prepartion, "Cerelose," 20 g., a protein hydrolysate, "Edamin," 20 g. corn steep liquor 5 g., distilled water 1000 ml.) are inoculated with *Nocardia restrictus* and incubated at 25° C. for 42 hours. After reinoculation of the culture and further incubation for 24 hours, a sample of 5(10),7-estradiene-3,17-dione dissolved in acetone is charged into the culture, the mixture is incubated for 3–48 hours, samples are extracted with ethylene chloride, and the resulting extract evaporated to dryness under nitrogen. The dry extract is dissolved in chloroform methanol 1:1. Thin-layer chromatography shows the presence of equilin and a small amount of equilenin, both compounds being identified by comparison with authentic samples.

Example 7

A culture of *Nocardia restrictus* is incubated at 25° C. for 42 hours in the nutrient medium described in Example 6. The culture is then centrifuged to remove nutrient medium, and resuspended in 0.03 molar phosphate buffer of pH 7.0. The resulting suspension of cells at pH 7.0 is charged with 1 mg. per ml. of 5(10),7-estradiene-3,17-dione dissolved in acetone. The mixture is incubated in 25° C. for 18–42 hours, extracted with ethylene chloride, and the extract chromatographed. Equilin is obtained and identified with an authentic sample.

I claim:
1. 5(10),7-estradiene-3,17-dione.
2. The method of preparing 5(10),7-estradiene-3,17-dione which comprises subjecting androsta-4,7-diene-3,17-dione-19-ol to pyrolysis at a temperature of about 350° C.
3. The method of preparing 5(10),7-estradiene-3,17-dione which comprises reducing 10-acetoxyestra-4,7-diene-3,17-dione by treating said compound with metallic zinc.
4. The method of preparing 5(10),7-estradiene-3,17-dione which comprises treating 10-acetoxyestra-4,7-diene-3,17-dione with metallic zinc in an atmosphere of nitrogen gas.
5. The method defined in claim 4, wherein, at the termination of said step of treating 10-acetoxyestra-4,7-diene-3,17-dione with metallic zinc, the reaction mixture is filtered, diluted with water, and extracted with ether to secure 5(10),7-estradiene-3,17-dione.
6. The method of preparing 5(10),7-estradiene-3,17-dione which comprises distilling androstra-4,7-dien-3,17-dione-19-ol at reduced pressure and at an elevated temperature.

No references cited.

ELBERT L. ROBERTS, *Primary Examiner.*